United States Patent

[11] 3,633,080

[72] Inventor Alvin N. Watson
Glendora, Calif.
[21] Appl. No. 32,849
[22] Filed Apr. 29, 1970
[45] Patented Jan. 4, 1972
[73] Assignee Johanson Technology, Inc.
Boonton, N.J.

[54] CAPACITOR UTILIZING A GLASS SLEEVE AS STRUCTURAL AND SPACING MEANS
4 Claims, 3 Drawing Figs.

[52] U.S. Cl. .......... 317/242, 29/25.42, 29/472.9, 65/59, 174/50.61
[51] Int. Cl. .......... H01g 1/00, H01g 3/02
[50] Field of Search .......... 317/242, 258; 174/50.61, 50.63, 52 S; 338/226, 237, 273, 274, 275, 276, 329; 65/36, 42, 59; 29/25.42, 472.9, 473.1

[56] References Cited

UNITED STATES PATENTS

| | | | |
|---|---|---|---|
| 2,552,653 | 5/1951 | Stupakoff | 317/242 |
| 3,064,070 | 11/1962 | Douglass et al. | 338/274 X |
| 3,169,217 | 2/1965 | Dalton | 317/258 UX |
| 3,447,236 | 6/1969 | Hatcher, Jr. | 29/472.9 X |
| 3,458,783 | 7/1969 | Rosenberg | 317/242 |

*Primary Examiner*—Laramie E. Askin
*Attorney*—Angus & Mon

ABSTRACT: A capacitor comprising a pair of leads held in spaced relationship by the compressive embrace of a glass sleeve which extends between them and interconnects them. The end surfaces of the leads constitute the plates of the capacitor, a spacer may optionally be positioned between the end surface of the leads more accurately to determine the size of the spacing between the end surfaces.

INVENTOR.
ALVIN N. WATSON
BY Angus & Mon
ATTORNEYS.

CAPACITOR UTILIZING A GLASS SLEEVE AS STRUCTURAL AND SPACING MEANS

This invention relates to capacitors, which can economically be produced in quantity to closer tolerances than have heretofore been available in devices of this general class.

In accordance with the present invention, a capacitor consists of a pair of cylindrical leads having planar end faces which are held in spaced relationship by the compressive embrace of a glass sleeve. The sleeve embraces the leads to hold the device assembled and to hold the end surfaces apart by a predetermined spacing. The capacitance of the device is determined by the spacing between the two leads, and the end surfaces of the leads provide the plates of the capacitor.

In accordance with an optional feature of the present invention, a spacer may be placed between the leads more conveniently to determine the size of the spacing between the end surfaces.

The above and other features of this invention will be more fully understood from the following detailed description and the accompanying drawings, in which.

Figure 1:
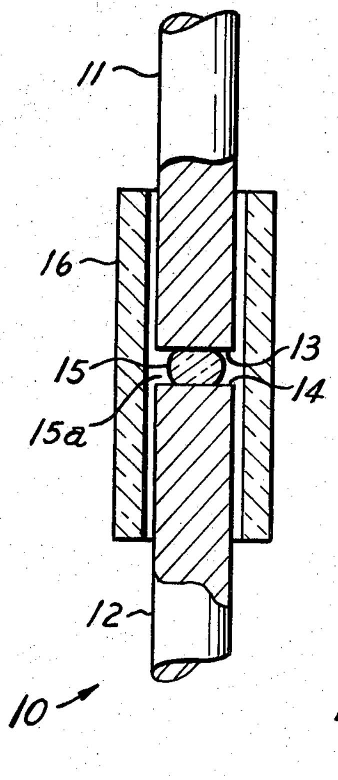
FIG. 1 is a side view elevation in cutaway cross section showing the method of constructing a capacitor in accordance with the presently preferred embodiment of the present invention.
Figure 2:
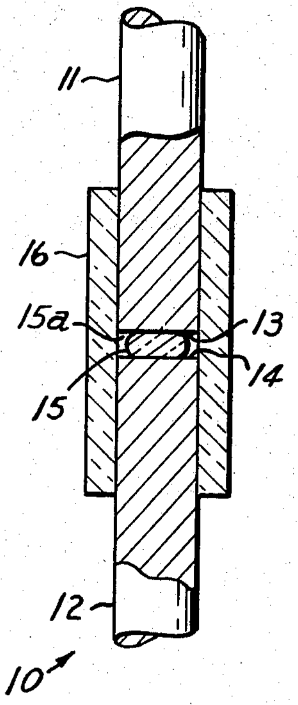
FIG. 2 is an axial cross section of the capacitor illustrated in FIG. 1 in its completed form.
Figure 3:
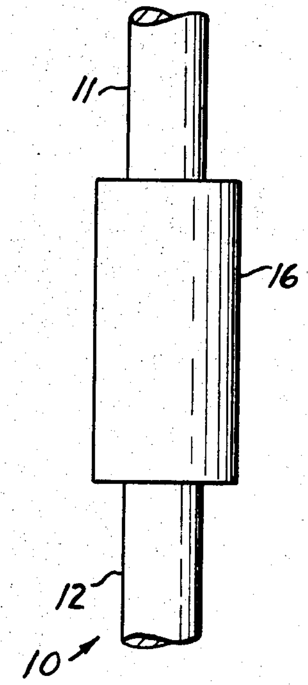
FIG. 3 is a side elevation of the capacitor illustrated in FIG. 2.

Referring to the drawings, there is showing a capacitor 10 in accordance with the presently preferred embodiment of the present invention. Capacitor 10 comprises a pair of leads 11 and 12 having planar end surfaces 13 and 14, respectively. Surfaces 13 and 14 are separated by a predetermined dimension to form a spacing **15*a* between them. Spacer 15 may be placed between surfaces 13 and 14 more accurately to space the faces apart. Spacer 15 may be constructed of any suitable dielectric material such as silicon, silicon monoxide, or silicon dioxide. Glass sleeve 16** is fitted over the arrangement and is constructed of a glass which will shrink at an elevated temperature so as to grasps the leads. Of course, it will further shrink when it cools.

By way of example sleeve 16 may be constructed of a suitable "Moly-matching glass," commercially available from many glass companies, such as Corning Glass Company, and is of the type which shrinks at an elevated temperature, such as about 710° C., but below the melting temperature of the glass. This elevated temperature is a "softening temperature," and the shrinkage then is in the nature of a contraction as a fluid, rather than the shrinkage characteristic of a thermal contraction, which is a consequence of the coefficient of expansion and the temperature change.

As an alternative to the use of "Moly-matching glass," "Dumet-matching glass" may be used with leads constructed of Dumet metal, a commercially available metal system which comprises a nickel iron alloy cladded with copper. Hence, if Dumet leads are used for leads 11 and 12, "Dumet-matching glass" may be used for sleeve 16.

It is preferred that the surfaces of leads 11 and 12 be coated with sodium borate so that as the sleeve is shrunk over the leads, the glass of the sleeve will seal against leads 11 and 12 so as to form a metal-to-glass fluid seal. A glass-containing lead oxide may be used, so that if the sleeve is heated in an atmosphere of "forming" gas, a gas commercially available and containing up to 15 percent hydrogen and more than 85 percent nitrogen, sleeve 16 will darken at the elevated temperature so that the sleeve need not be painted or otherwise coated to make it attractive.

When in the position illustrated in FIG. 1, the temperature of sleeve 16 is elevated to shrink fit the sleeve onto the outer surfaces of leads 11 and 12 and hold the heads by an embracing grasp. As sleeve 16 shrinks over leads 11 and 12, the axial dimension of sleeve 16 also becomes smaller thereby drawing leads 11 and 12 into tight contact against spacer 15 to exert a compressive force on spacer 15. When the device is cooled, further shrinkage of this nature also occurs. Spacer 15 is accurately sized relative to the diameters of leads 11 and 12 so that the size of gap **15*a* is predetermined, and the resultant capacitance of capacitor 10** is known.

It is desirable to use leads whose diameters closely match the inside diameters of sleeves 16. In this regard, it is preferred that the diameter of leads 11 and 12 be smaller than the inside diameter of sleeve 16 by between about 0.0005 and 0.003 inch.

It is also desirable to use a glass sleeve containing lead oxide and to shrink the sleeve in an atmosphere containing forming gas of nitrogen and up to 15 percent hydrogen so the sleeve will darken to be opaque and be esthetically pleasing.

The present invention thus provides a capacitor which may be produced in large quantities and which is rugged and effective in use. The capacitance of capacitors manufactured in accordance with the present invention may be controlled to within ±0.1 pf. by accurately controlling the size of the space between the plates formed by the opposite surfaces 13 and 14 of leads 11 and 12, respectively, and by controlling the type of dielectric material comprising spacer 15.

This invention is not to be limited by the embodiment shown in the drawings and described in the description, which is given by way of example and not of limitation, but only in accordance with the scope of the appended claims.

What is claimed is:

1. A capacitor consisting of first and second cylindrical metal leads having planar end surfaces spaced apart by a predetermined distance to form a spacing between them, and a glass sleeve surrounding, embracing, and interconnecting said leads and surrounding said gap, said sleeve comprising the sole interconnection between the leads, and holding said leads only by the embrasive contact, the end surfaces constituting the plates of the capacitor.

2. Apparatus according to claim 1 in which a nonconductive spacer is placed in said spacing in contact with the end surfaces to determine the spacing, and occupying less than the total cross-section of the region between the end surfaces.

3. Apparatus according to claim 2 wherein said sleeve forms a metal-to-glass seal with said leads.

4. Apparatus according to claim 1 wherein said sleeve forms a metal-to-glass seal with said leads.

* * * * *